United States Patent
Dodge et al.

[11] Patent Number: 6,019,423
[45] Date of Patent: Feb. 1, 2000

[54] ANATOMICALLY CORRECT BICYCLE SEAT

[76] Inventors: John R. Dodge, 12272 Utica Pl., Broomfield, Colo. 80020; John P. Dodge, 1507 Brixham Ave., McHenry, Ill. 60050

[21] Appl. No.: 09/170,332

[22] Filed: Oct. 13, 1998

Related U.S. Application Data

[63] Continuation-in-part of application No. 08/993,669, Dec. 18, 1997.

[51] Int. Cl.[7] ........................................ B62J 1/02
[52] U.S. Cl. ................. 297/195.1; 297/209; 297/214
[58] Field of Search .............................. 297/195.1, 209, 297/211, 214, 452.23, 452.25

[56] References Cited

U.S. PATENT DOCUMENTS

| | | | |
|---|---|---|---|
| 576,310 | 2/1897 | Henderson | 297/214 |
| 619,179 | 2/1899 | Hunt | 297/209 |
| 654,720 | 7/1900 | Englebert | 297/214 |
| 1,157,512 | 10/1915 | Deem | 297/209 |
| 3,249,384 | 5/1966 | Timms | 297/209 |
| 5,507,476 | 4/1996 | Lin | 297/209 X |
| 5,720,518 | 2/1998 | Harrison | 297/214 |

FOREIGN PATENT DOCUMENTS

| | | | |
|---|---|---|---|
| 141949 | 11/1948 | Australia | 297/209 |
| 51582 | of 0000 | Germany | 297/209 |

*Primary Examiner*—Peter M. Cuomo
*Assistant Examiner*—Stephen Vu
*Attorney, Agent, or Firm*—Mathew R. P. Perrone, Jr.

[57] ABSTRACT

An anatomically correct bicycle seat, which includes a platform to receive the buttocks of a bicycle rider and a support mechanism for the platform in order to permit the anatomically correct seat to be mounted on a bicycle, relieves on blood vessels of a bicycle rider.

15 Claims, 7 Drawing Sheets

ANATOMICALLY CORRECT BICYCLE SEAT

CROSS-REFERENCE TO RELATED APPLICATION

This application is a continuation in part of U.S. Patent Ser. No. 08/993,669, filed Dec. 18, 1997, filed by the same inventive entity.

This invention relates to a bicycle seat, and more specifically to a bicycle seat having minimized effect on the groin and genitalia of a bicycle rider.

BACKGROUND OF THE INVENTION

Traditional bicycle seats are saddle-shaped and put all of the cyclist's weight on the pubic tubercle and ischiopubic ramus of the pelvis. The recent literature cites increasing reports by cyclists, amateurs and professionals alike, who suffer adverse effects therefrom. Typical adverse experiences, caused by pressure induced by the currently designed saddle-shaped bicycle seat resulting in blunt trauma to the perineal and pelvic structures, suffered include the following symptoms: groin numbness or paresthesia, penile numbness or paresthesia, immediate impotence, delayed impotence, inability to ejaculate or experience orgasm, or the possible correlation with an elevated prostate specific antigen score.

The horn of the saddle designed seat fits directly against the before mentioned pelvic structures. This results in occlusion of arteries and veins supplying blood flow to the penis, as well as, compression of local nerves as they are sandwiched between the horn of the bicycle seat and the bony structures of the anterior pelvis. The resultant outcome is a numbing effect or paresthesia, as reported by many cyclists, that can result in sustained paresthesia of the groin and penis, delayed or immediate impotence, and perhaps even an elevated prostate specific antigen.

Many scientific studies are known to have considered this problem. One study by K. V. Andersen and G. Bovim, entitled "Impotence and Nerve Entrapment in Long Distance Amateur Cyclist" published in *Acta Neuro Scandinavia* in 1997 provides the results of questioning 160 male Norwegian bicyclists following a 540 kilometer bicycle touring race for symptoms of peripheral nerve compression after long distance cycling.

The gist of the article is that (1) twenty two (22%) percent of the responding males reported symptoms from the innervation areas of the pudendal or cavernous nerves. Thirty-three males had penile numbness or paresthesia; (2) ten of those had numbness that lasted for more than one week; and (3) impotence was reported by 21 or thirteen (13%) percent of the males which lasted more than one week in eleven subjects and for more than one month in three subjects. They concluded that the frequency of impotence and penile numbness may be higher than indicated and the symptoms may last for as long as eight months following blunt trauma to the peripheral nerves.

B. D. Weiss in the *Nontraumatic Injuries in Amateur Long Distance Bicyclists*, which appeared in the *American Journal of Sports Medicine* of Mar. 13, 1985, at pages 187 to 192, reports the questioning 132 participants in a 500 mile 8-day bicycle tour to determine the frequency and severity of nontraumatic injuries experienced by riders. The cyclists rode an average of 95.8 miles per week on a routine basis. Following the race, they found the most nontraumatic injury to be buttock pain experienced by 32.8% of the riders. Groin numbness and paresthesia occurred in approximately 10% of the participants.

F. J. Levine, A. J. Greenfield, and I. Goldstein in their article "Arteriographically Determined Occlusive Disease Within the Hypogastric-Cavernous Bed in Impotent Patients Following Blunt Perineal and Pelvic Trauma", which appeared in the *Journal of Urology* 1990; Volume 144, Number (5) at Pages 1147–1153; reported on the presence, location, and pattern of arterial occlusive disease within the hypogastric-cavernous arterial bed in impotent men following blunt perineal and pelvic trauma. They reviewed internal pudendal arteriogram of 20 patients with a history of blunt perineal trauma and seven with blunt pelvic trauma, who immediately developed of impotence. Arteriographic studies of 104 other impotent patients were reviewed for a comparison.

Patients who had suffered blunt pelvic and perineal trauma had significantly different patters of arteriographically demonstrated occlusive disease within the distal hypogastric-cavernous arterial bed consistent with the site of traumatic injury. Those who sustained blunt pelvic trauma and had immediate impotence revealed arterial occlusive lesions mainly in the internal pudendal, common penile, cavernous, and dorsal arteries. Those who sustained blunt penile trauma and complained of immediate impotence demonstrated a more focal pattern of pathological arterial occlusion primarily in the cavernous and dorsal arteries. Those with blunt perineal trauma demonstrated a significantly higher incident of solitary arterial lesions in the cavernous artery without proximal disease than those with blunt pelvic trauma, 48% and 8%, respectively.

They hypothesized that blunt trauma without immediate impotence may be a potential risk factor for the late development of arterial vasculogenic impotence, and that unrecognized or seemingly innocuous trauma may be a factor in cases of idiopathic impotence. Patient without trauma and vascular factors have more diffuse patterns of arteriographically demonstrated arterial lesions.

L. A. Mathews, T. E. Herberner, and A. D. Seftel, in their article, "Impotence Associated with Blunt Pelvic and Perineal Trauma; Penile Revascularization as a Treatment Option", which appeared in the papers of the *Seminar on Urology* in 1995, Chapter 13 Volume 1, Pages 66–72; also recognized erectile dysfunction or impotence as a well-known complication from blunt pelvic and perineal trauma. The mechanism of injury is usually related to the trauma itself through the shearing of the penile vasculature in the pelvis or by direct trauma to the vasculature in the perineum.

R. M. Munarriz, Q. R. Yan, A. Znehra, D. Udelson, and I. Goldstein in their article, "Blunt Trauma: The Pathophysiology of Hemodynamic Injury Leading to Erectile Dysfunction" which appeared in the Journal of Urology of 1995 Volume 153, Number 6 at Pages 1831–1840, reported on blunt trauma as it relates to the pathophysiology of the hemodynamic injury leading to erectile dysfunction. Out of 131 men studied, corporeal veno-occlusive dysfunction was identified in 62% of the cases and cavernous artery insufficiency in 70% . Patients with pelvic trauma had significantly more abnormal sites of venous drainage and more sever degrees to which venous structures filled with contrast media when observe with arteriography. Pharmaco-arteriography revealed the site specific arterial occlusive lesions that were consistent with the site of impact.

Traumatic vasculogenic impotence is hypothesized to be the result of direct injury to the proximal corpora and its arterial inflow bed. Traumatic veno-occlusive dysfunction is theorized to be the consequence of focal intracavernous wound repair and permanent focal alterations in erectile tissue compliance. They reported that traumatic vasculogenic impotence afflicts and estimated 600,000 American men of whom 250,000 have sports-related injuries.

A. Rana and G. D. Chisholm, in their article "He Sold His Bike for a Low Prostate Specific Antigen", which appeared in the Journal of Urology 1994, Volume 151, Number 3 at Page 700, describe an individual who holds his bicycle seat on an exercise bicycle responsible for an elevated prostate specific antigen (PSA). The 80 year old patient quit exercising on that seat, resulting in a drop from a clinical stage T3 adenocarcinoma of the prostate and a PSA of 3,244 milligrams per milliliter at the time of diagnosis. The patient usually rides his exercise bicycle every morning for 1 to 2 miles. On the presumption that the activity is causing the marked increase in his PSA, he was instructed to decrease his exercise.

With the decreased use of his exercise bicycle, and no treatment for his adenocarcinoma, his PSA consistently decreased. After 24 months, the patient ceased all bicycle riding and his PSA was decreased to 5.9 milligrams per milliliter. The riding of his exercise bicycle with the standard miniaturized saddle exerts a direct pressure on the perineum and prostate. They reported that the high PSA levels were consistent with the massaging action of the bicycle seat on the prostatic tumor.

H. R. Safford, D. E. Craford, S. H. Mackenzie, and M. Capriola, in their article, "The Effect of Bicycle Riding on Serum Prostate Specific Antigen Levels", which appeared in the *Journal of Urology* 1996, Volume 156, Number 7 at Pages 103 to 105, reported on the effect of bicycle riding on serum prostate specific antigen levels. They obtained baseline PSA levels from 260 volunteers before completing a 250 mile bicycle race. After the 4 day race, PSA was remeasured and the level was compared to the pre-race levels. They found no statistically or clinically significant elevation in the PSA after bicycle riding. However, those with an initially elevated PSA had an increase after bicycle riding, although the change did not represent the population. More research is needed on this topic.

Most recently Dr. Irvin Goldstein, a leading Urologist and pioneer in the surgical treatment of impotence at the Boston Medical Center, was featured on the Sep. 18, 1997 edition of 20/20 entitled *Men, Biking, and Impotence*. One of his conclusions is that numbness in the groin may be the first warning sign of impending impotence or the inability to have an erection. Another part of his data shows that six out 100 men in his practice can trace back the cause of impotence to bicycling. The theory behind this is that all of the person's weight is supported by the artery to the penis and has confirmed this by finding artery blockage in the exact position where the bicycle seat fits a mans crotch. Dr. Goldstein has determined that just 11% of a man's weight can cause compression of the penile arteries as they press on the bicycle seat. The injury is typically bilateral as the pressure from the ischiopubic ramus of the pelvis compresses the penile arteries against the bicycle seat.

The penile arteries normally bounce back from episodes of compression but with repeated and extended injury they could cause permanent damage to the vessel walls leading to blockage of blood flow resulting in impotence. According to Dr. Goldstein, this repeated trauma causes hardening and flattening of the arteries much like that caused by hypertension and cigarette smoking. This repeated insult to the vessels over time can lead to delayed impotence. He reported that 52% of men in the United States are impotent. He estimates that there are approximately 100,000 men that have become impotent from damage inflicted by bicycle seats. He boldly stated that he would not ride a bicycle with its seat in the present design form.

Thus it proper to conclude that there is a major problem with bicycle seat design. This problem requires an effective solution.

SUMMARY OF THE INVENTION

Among the many objectives of this invention is the provision of a bicycle seat adapted to protect the genital area of a rider.

A further objective of this invention is to provide an anatomically correct seat to assist in the positioning of a rider on the bicycle.

A still further objective of this invention is to provide an anatomically correct seat to provide comfort for a rider.

Yet a further objective of this invention is to provide an anatomically correct seat to avoid arterial pressure on a rider.

Also an objective of this invention is to provide an anatomically correct seat with strong seat support.

Another objective of this invention is to provide an anatomically correct seat for use on a bicycle.

Yet another objective of this invention is to provide an anatomically correct seat for relieving pressure on the bone structure.

Still another objective of this invention is to provide an anatomically correct seat to provide comfort for a rider.

These and other objectives of the invention (which other objectives, become clear by consideration of the specification, claims and drawings as a whole) are met by providing an anatomically correct bicycle seat, which includes a platform to receive the buttocks of a bicycle rider and a support mechanism for the platform in order to permit the anatomically correct seat to be mounted on a bicycle.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
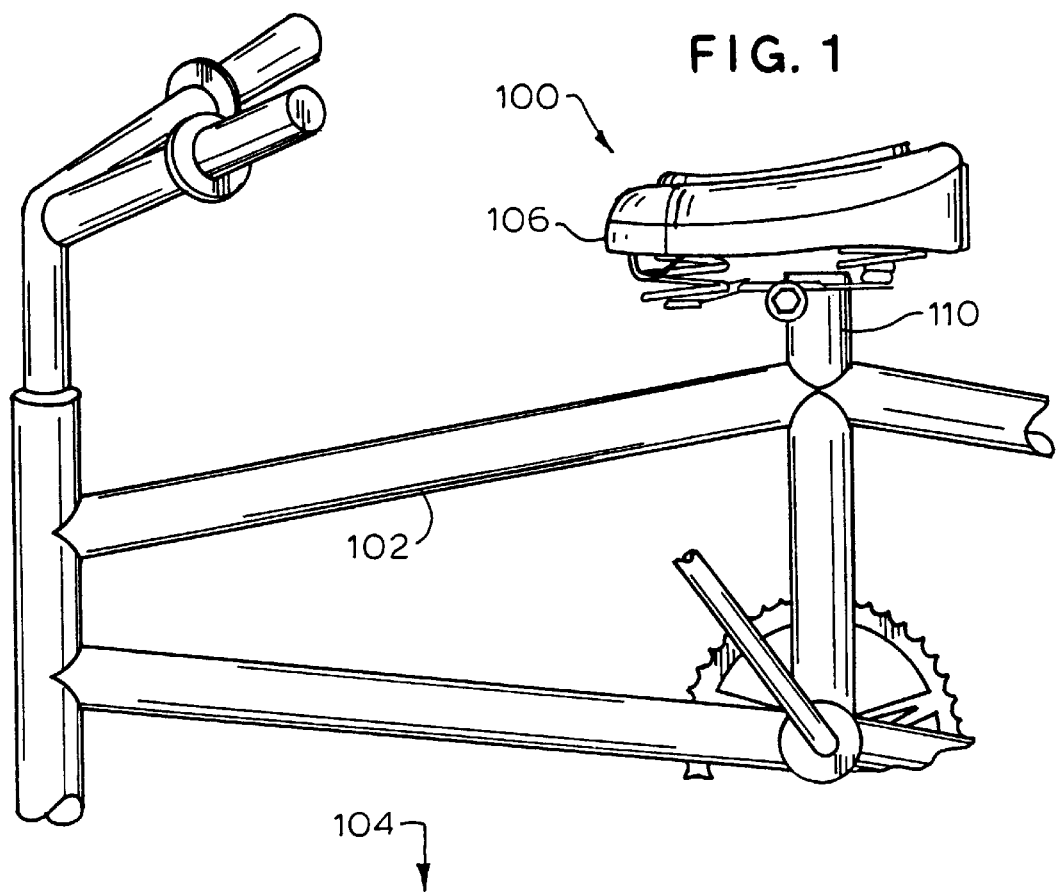
FIG. 1 depicts a side view of the anatomically correct seat 100 of this invention, as applied to a bicycle 102.
Figure 2:
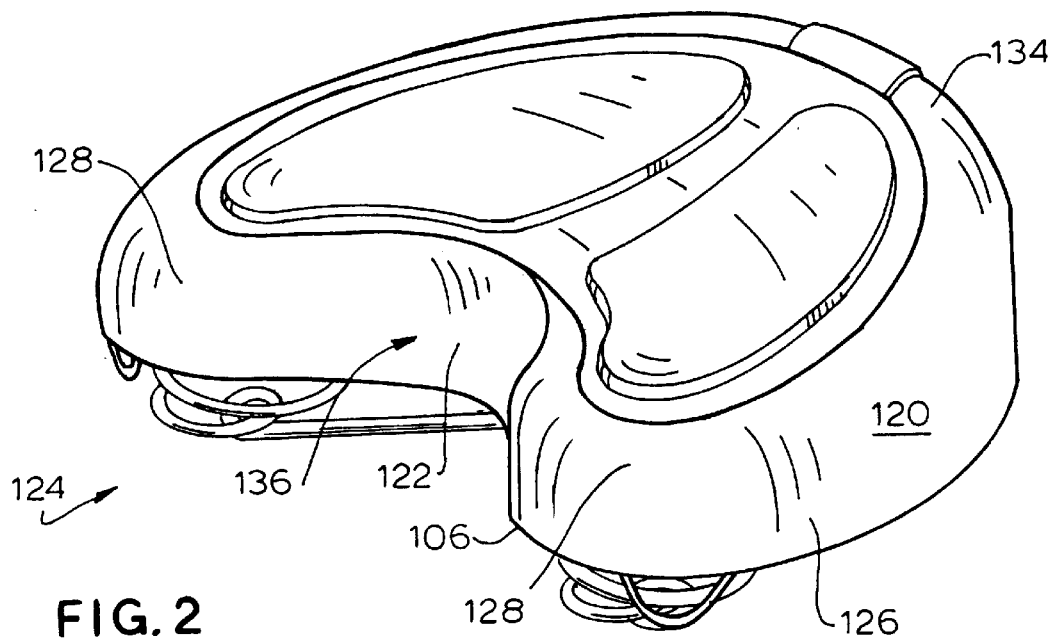
FIG. 2 depicts a top perspective view of the anatomically correct seat 100 of this invention.

In view of the recent scientific evidence and other experience with paresthesia following bicycle riding, an anatomically correct bicycle seat supports the bicycle rider and greatly minimizes pressure on the genital area of a human bicycle rider of either gender. For a male, this anatomically correct bicycle seat greatly minimizes or even completely eliminates an impotence problem. The anatomically correct bicycle seat of this invention also allows the cyclist to ride more comfortably.

Therefore, the anatomically correct bicycle seat is designed to eliminate the etiologic feature of the conventional bicycle seat that causes repeated sustained blunt trauma to the perineal and pelvic structures. This eliminated feature is the horn of the conventional saddle-shaped bicycle seat.

The anatomically correct bicycle seat includes a U-shaped member, having incorporated therein an open design in the middle thereof to relieve all pressure on the blood vessels and nerves in the groin area. This revolutionary new seat allows the cyclist's weight to be positioned both laterally and posteriorly onto the ischial tuberosity of the pelvis in order to redistribute the cyclist's weight much like a normal seat. Therefore, the cyclist's weight is more evenly distributed over the structures that are able to support the pressure instead of over the fragile tissues of the anterior pelvis.

This seat will benefit the millions of people who ride conventional and stationary bicycles by allowing the user to have a more secure seat that does not put pressure on the groin region, yet still permitting for a full range of motion for the cyclist to exercise effectively. Moreover, obese individuals will have an even greater benefit as they will have the confidence to ride free from pain and numbness in the groin.

The bicycle seat can eliminate this most unfortunate and serious sequelae from such anatomically damaging seats. The anatomically correct bicycle seat allows the bicyclist to have all of the benefits of bicycle exercise without experiencing numbness of the groin and penis, or delayed or immediate impotence caused by vascular occlusion and nerve compression experienced with the conventional saddle-shaped bicycle seat.

Not only does this seat include a U-shaped member, the forward part or the front flat edge of the U-shaped member can be inwardly arced. Because this front inward arc is at the legs of a rider, pressure is greatly reduced on blood vessels and nerve structure. This inward arcing helps accommodate sides of the bicycle rider and provide for a more efficient seat. In this fashion, the desired results can be obtained and the comfort of the seat can be greatly increased for at the same time permitting appropriate power to be applied to the pedals of the bicycle by the rider.

This new design for an anatomically correct bicycle seat eliminates the described flaws of the prior art bicycle seat. The anatomically correct bicycle seat allows the user to ride a bicycle more comfortably and securely. The U-shaped bicycle seat of this invention is specifically designed to eliminate pressure to the anatomical structures associated with the groin or anterior pelvis. More specifically, this anatomically correct bicycle seat eliminates pressure from the pubic bone.

The pressure points are moved to a more posterior position and lateral to the ischial tuberosity of the pelvis. This allows for the redistribution of weight from compressing the vessels and nerves of the anterior pelvic region to the large muscles and more substantial areas of the pelvis conducive to weight bearing.

The arc of the U-shaped seat faces the rear of the bicycle. The substantially flat, top edge part of the U-shaped seat may include a pair of arcs in the edge thereof, in order to minimize pressure on the cyclist's body is preferred.

On top of the seat may be a pair of slight protrusions. These protrusions assist the positioning of the buttocks of a bicycle rider, while minimizing the undesired pressure on nerves or blood vessels.

A series of rods positioned under the seat and around the bicycle post provide appropriate strength and support for the seat. This series of rods are spaced beneath, and around and within the outer edge of the seat from the center mounting. Various patterns are suitable for support use.

Preferably there are four springs on the seat. The springs are mounted on the underside of the seat. Bolts protrude from the underside of the seat. Each bolt preferably forms the corner of an isosceles trapezoid. A spring fits over each bolt. A section of a rod assembly fits on the bolt, thereby trapping the spring in a supporting fashion against the underside of the seat thanks to the present of a nut.

No matter what the shape of the rod assembly, a length of the rod assembly is clamped to center post of the bicycle, due to a shaped extension of members of the rod assembly extending from the bolt to the center post. The rod assembly relationship to the springs provides support and stability for the seat.

An especially preferred assembly for an anatomically correct bicycle includes a seat platform. Mounted on the seat platform is a shaped pad. A shaped clip member secures the shaped pad to the seat platform.

Below the seat platform are mounted seat springs. Preferably, the seat springs are bolted to the platform, on a bottom side thereof. The seat bolt apertures fit through seat bolt apertures in seat platform, and then through seat springs.

Preferably there are four seat bolts. Two seat braces receive two of the four seat bolts, and are positioned adjacent to the spring and oppositely disposed from the seat frame. Each seat brace is an elongated bent rod having a bolt receiving loop at each end thereof. Centrally situated in each seat brace is a bracket receiver. The bent rod is shaped to mount the seat frame to bicycle efficiently.

The seat bracket for mounting the seat to bicycle includes a platform. Preferably the platform is rectangular in shape. On opposing sides of the platform is a brace receiver. Brace receiver is arced to wrap at least partially around bracket receiver. Each brace receiver and bracket receiver may be welded, glued, crimped or otherwise secured together.

Extending below the platform of the seat bracket is a flattened clamp receiver. The seat bracket may be machined or molded, or otherwise shaped. Flattened clamp receiver includes a pin aperture therein. Also flattened clamp receiver has a arcuate bottom edge, adapted to permit restricted movement in a backward and froward motion.

The clamp is secured to the bicycle seat post. This clamp includes a slot determined by two arms. Each arm includes an arm aperture adapted to receive a seat pin and cooperate with pin aperture in order to secure the seat platform to the bicycle.

Cooperating with the seat pin, the clamp and the clamp receiver is a double coil spring. The double coil spring has a first coil and a second coil connected by a U-shaped loop. U-shaped loop fits around the front position of the clamp, while first coil is substantially adjacent to and substantially concentric with one of arm aperture. Second coil is similarly positioned relative to the opposing arm aperture.

Each end of the double coil spring is braced against the underside of seat bracket. The double coil spring preferably terminates in a right angle bend at each end thereof. The double coil receives the seat pin as the seat passes then through clamp and the clamp receive.

To seat platform is secured a padded derriere support, preferably shaped to conform to the desired seat appearance set forth herein. This support may be a shaped pad formed in any suitable fashion. While the padded derriere support may be glued or other secured to the seat platform, it is preferred to use a clip shaped to match the combination of the seat platform and the padded derriere support, both of which have the same edge outline.

The clip is shaped to fit around and join seat platform to padded derriere support. At a clip base are preferably three wedges adapted to contact the underside edge of seat platform at three different points. The arced side of the clip locks the padded derriere support onto the seat platform. Preferably, the derriere support is preferably a slightly flexible, molded one piece unit.

Figure 4:
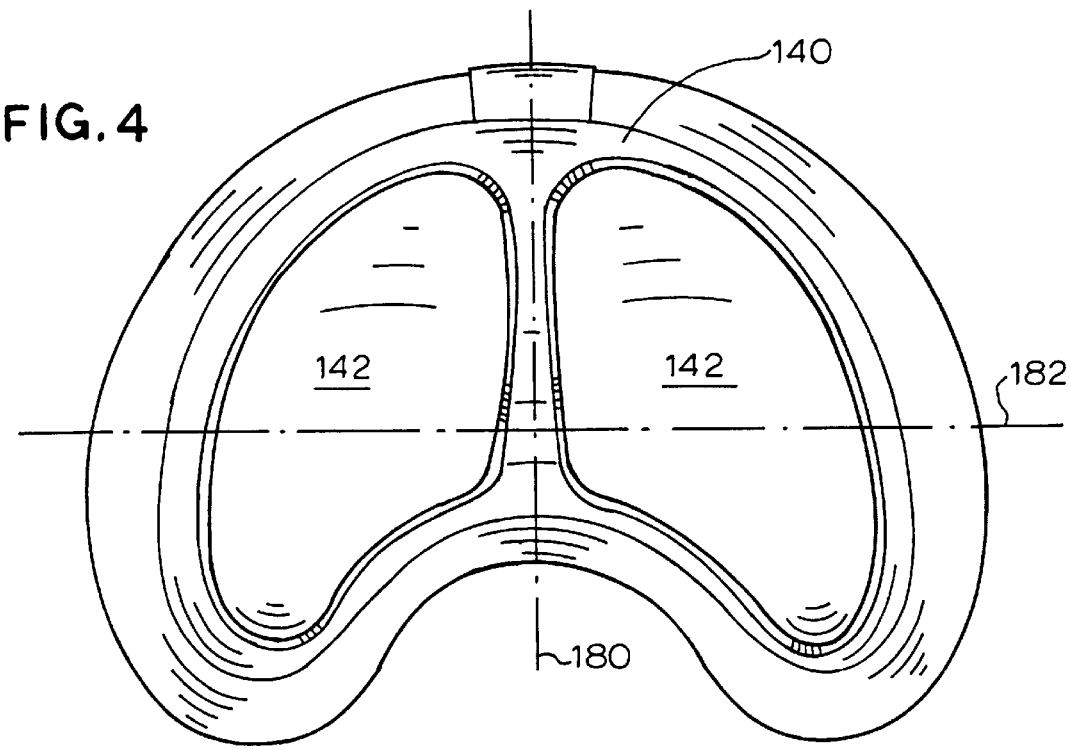
FIG. 4 depicts a top plan view of the anatomically correct seat 100 of this invention.
Figure 5:
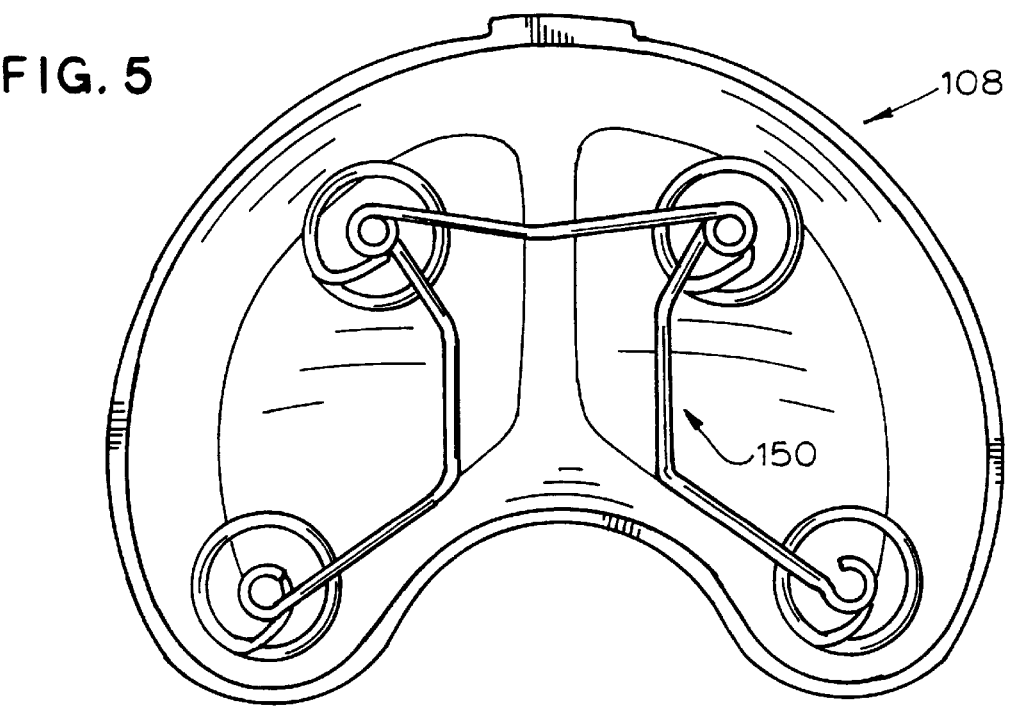
FIG. 5 depicts a bottom plan view of the anatomically correct seat 100 of this invention.

Referring now to FIG. 1, anatomically correct bicycle seat 100 is shown as positioned on bicycle 102. The anatomically correct bicycle seat 100, from a top view 104 (FIG. 4) has a U-shaped member 120, which incorporates an open design in the front middle portion 122 in the form of an inward arc to relieve all pressure from the seat 100 on the vessels and nerves in the groin area of the cyclist.

Adding FIG. 2, FIG. 3, FIG. 4 and FIG. 5 to the consideration, the bicycle seat 100 has a forward part 124 of the U-shaped member 120 in the form of two outward arcs surrounding the front middle portion 122. In each outward arc of forward part 124 is an inward arc 128 to relieve pressure on the legs of a cyclist. Each inward arc 128 reduces pressure at the top of the rider's thigh.

The anatomically correct bicycle seat 100 allows the user to ride the bicycle 102 more comfortably and securely. The U-shaped bicycle seat 100 of this invention is specifically designed to eliminate pressure to the anatomical structures, especially those in the pubic area.

The U-shaped member 120 may be of any size and is related to the size of the cyclist. The top proportions of the U-shaped member 120 are adjusted as desired. A large-sized version of seat 100 may have a vertical axis 170 of 20 to 30 centimeters and a horizontal axis 180 of 40 to 50 centimeters. A medium-sized version of seat 100 may have a vertical axis 180 of 15 to 20 centimeters and a horizontal axis 182 of 20 to 30 centimeters. A small-sized version of seat 100 may have a vertical axis 180 of 10 to 15 centimeters and a horizontal axis 182 of 15 to 20 centimeters.

The rear exterior arc 134 of the U-shaped seat 100 faces the rear 104 of the bicycle 102. The front interior arc 136 of the U-shaped seat 100 faces the front 106 of the bicycle 102. The substantially top edge part of the U-shaped seat 100 adjacent to front interior arc 136 may include symmetrical inward arcs 128 in the edge thereof, in order to minimize pressure on the cyclist's body and specifically on the leg in a preferred manner.

From top view 104, on top receiving surface 140 of the seat 100 may be a pair of slight protrusions 142. These protrusions 142 assist the positioning of the buttocks, while minimizing or eliminating the undesired pressure. Such protrusions 142 may be up to one centimeter in height and have three outer arcs with one inner arc.

Figure 3:
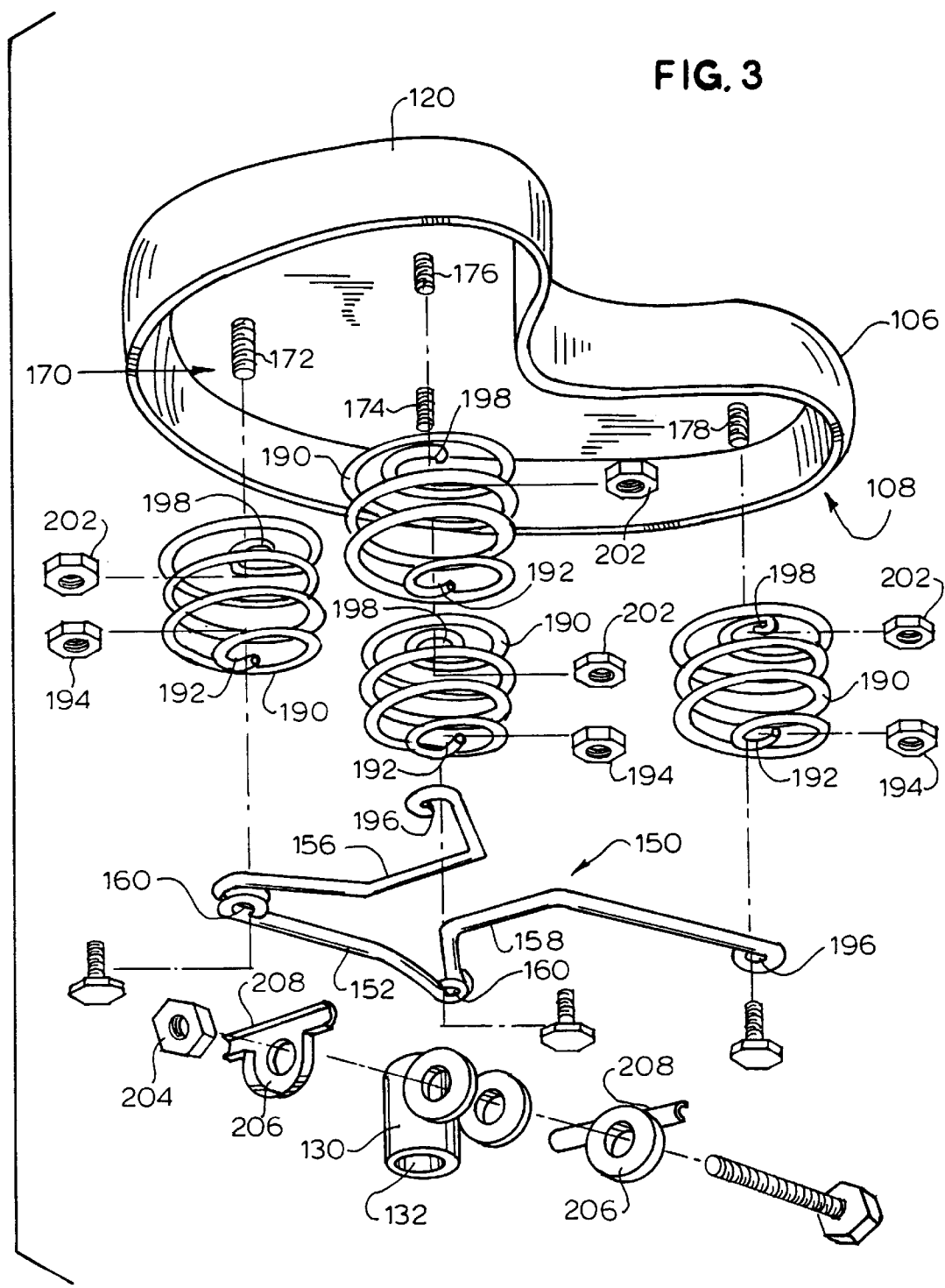
FIG. 3 depicts a bottom, exploded perspective view of the anatomically correct seat 100 of this invention.

Referring specifically to FIG. 3, a open-ended, rod assembly 150, positioned under the seat 100 and specifically the U-shaped member 120, and around the bicycle seat post 110, provides appropriate strength and support for the seat 100. Three members in open-ended, rod assembly 150 are preferred, while four members may be necessary for a heavy duty support. The rod assembly 150 runs around the outer edge 126 of the seat 100, when seen from bottom view 108.

In FIG. 3, the bottom view 108 of U-shaped member 120 includes a series of four of a mounting post assembly 170 secured thereto. Mounting post assembly 170 has a first threaded member 172 and second threaded member 174, which preferably combined to form the bottom vertices of the longer base of an isosceles trapezoid. The third threaded member 176 and fourth threaded member 178 combine to form the top vertices and the upper base of an isosceles trapezoid.

On each of the mounting post assembly 170 may be fitted a spring 190 of a standard type for a bicycle seat. This spring 190 has a seat loop 198, which is portioned on a member of mounting post assembly 170, such as fourth threaded member 178. Seat nut 202 is threaded onto fourth threaded member 178, thereby holding spring 190 in place with seat loop 198.

Lower spring loop 192 cooperates with a first nut and bolt assembly 194. The spring 190 then receives rod member of mounting post assembly 170 at the outside loop 196. The spring 190 then receives rod member of mounting post assembly 170 at the outside loop 196.

Rod assembly 150, as shown in FIG. 3, includes an aperture bend 198, which can receive a member of the mounting post assembly 170 secured thereon by a spring nut 202. As any of first threaded member 172, second threaded member 174, third threaded member 176 and fourth threaded member 178 pass through aperture bend 198, rod nut and bolt assembly 194 secures the rod assembly 150 thereon and over spring 190, at lower spring loop 192.

Open-ended, rod assembly 150 has a generally squared U-shape with a base 152 adjacent to rear exterior arc 134 of the U-shaped seat 100. At each end base 152 is a bolt aperture 154 formed by a coiling of rod assembly 150. One bolt aperture 154 receives either one of third threaded member 176 or fourth threaded member 178. The other bolt aperture 154 receives the remaining member of that pair.

From one bolt aperture 154 extends first arm 156 of rod assembly 150. From the other bolt aperture 154 extends second arm 158 of rod assembly 150. Both first arm 156 and second arm 158 end in rod loop 160. Each rod loop 160 respectively receives one of first threaded member 174 and second threaded member 176.

Substantially centered in the seat 100 is a center mounting post receiver 130. Bicycle seat post 110 receives post aperture 132 of center mounting post receiver 130, which is clamped thereon in a standard fashion. can have seat 100 secured thereby by a modification of a standard bicycle seat nut assembly 204 which uses washer 206, thereby securing the seat 100 to the bicycle 102. The rod assembly 150 and the springs 190 combine to make the seat 100 flexible and relieve the desired pressure on the areas of the body.

Washer 206 includes an upper rod arm receiver 208. There is washer 206 with an upper rod arm receiver 208. If one of upper rod arm 208 is adapted to receive first arm 156, it occurs while oppositely disposed rod arm 208 receives second arm 158. This clamping mechanism secures the seat 100 to the bicycle 102. Center mounting post receiver 130 of seat 100 receives bicycle seat post 110 (FIG. 1) and thereby mounts seat 100 on bicycle 102. Such structure adds to the strength of the seat 100.

Figure 6:
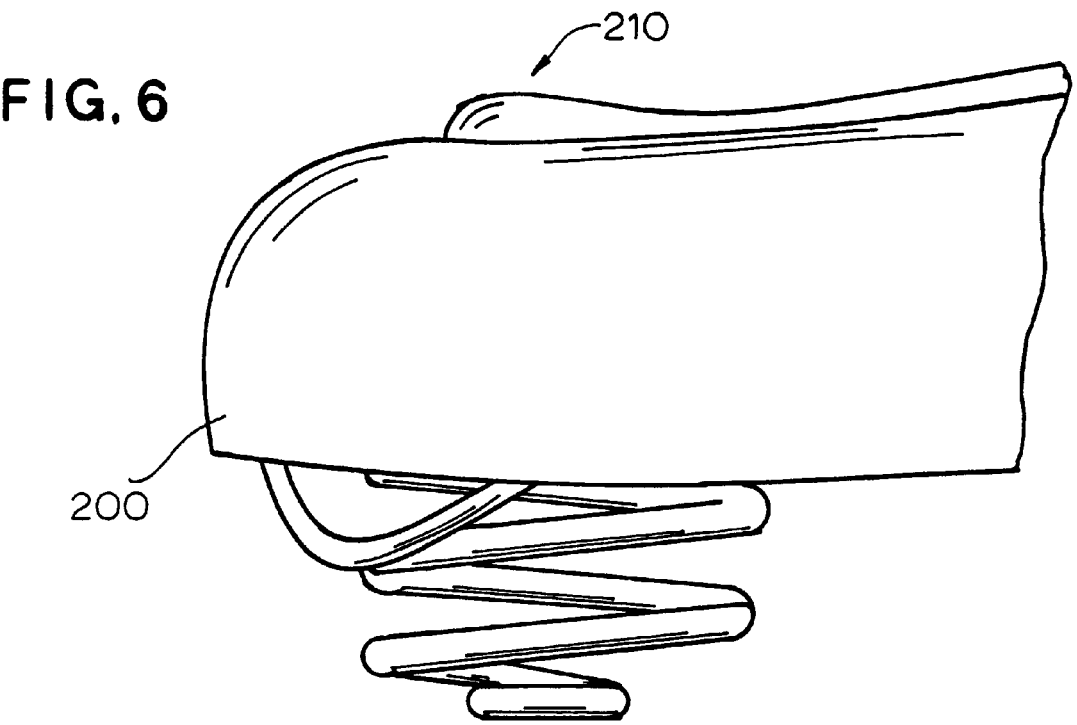
FIG. 6 depicts a side view of the anatomically correct seat 100 with front arc modification 200 of this invention.

In FIG. 6, anatomically correct seat 100 has a front arc modification 200. On the U-shaped member 120, adjacent to the front interior arc 136, the front arc modification 200 is shown. Each portion of the U-shaped member 120 adjacent to front interior arc 136 has an increased downward slope 210. This slope 210 minimizes rear thigh contact for a rider.

Figure 7:
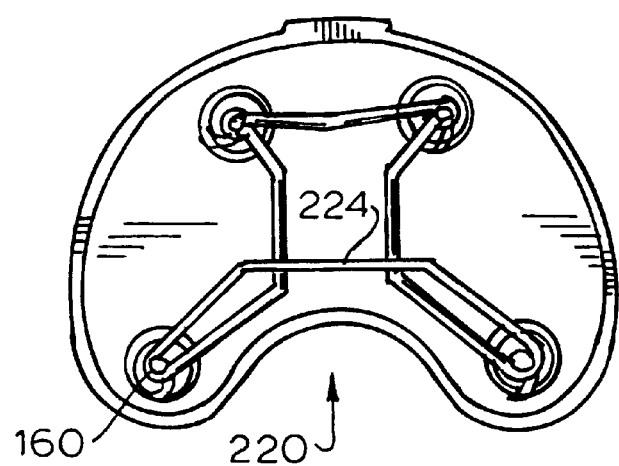
FIG. 7 depicts a bottom plan view of the anatomically correct seat 100 of this invention, with a square rod assembly 220.

In FIG. 7, a modified version of U-shaped rod assembly 150 is depicted. Square rod assembly 220 adds additional support to the area around front interior arc 136. Extension piece 224 joins each rod loop 160. It is the extension piece 224, which completes square rod assembly 220 and provides additional front support for anatomically correct seat 100.

Figure 8:
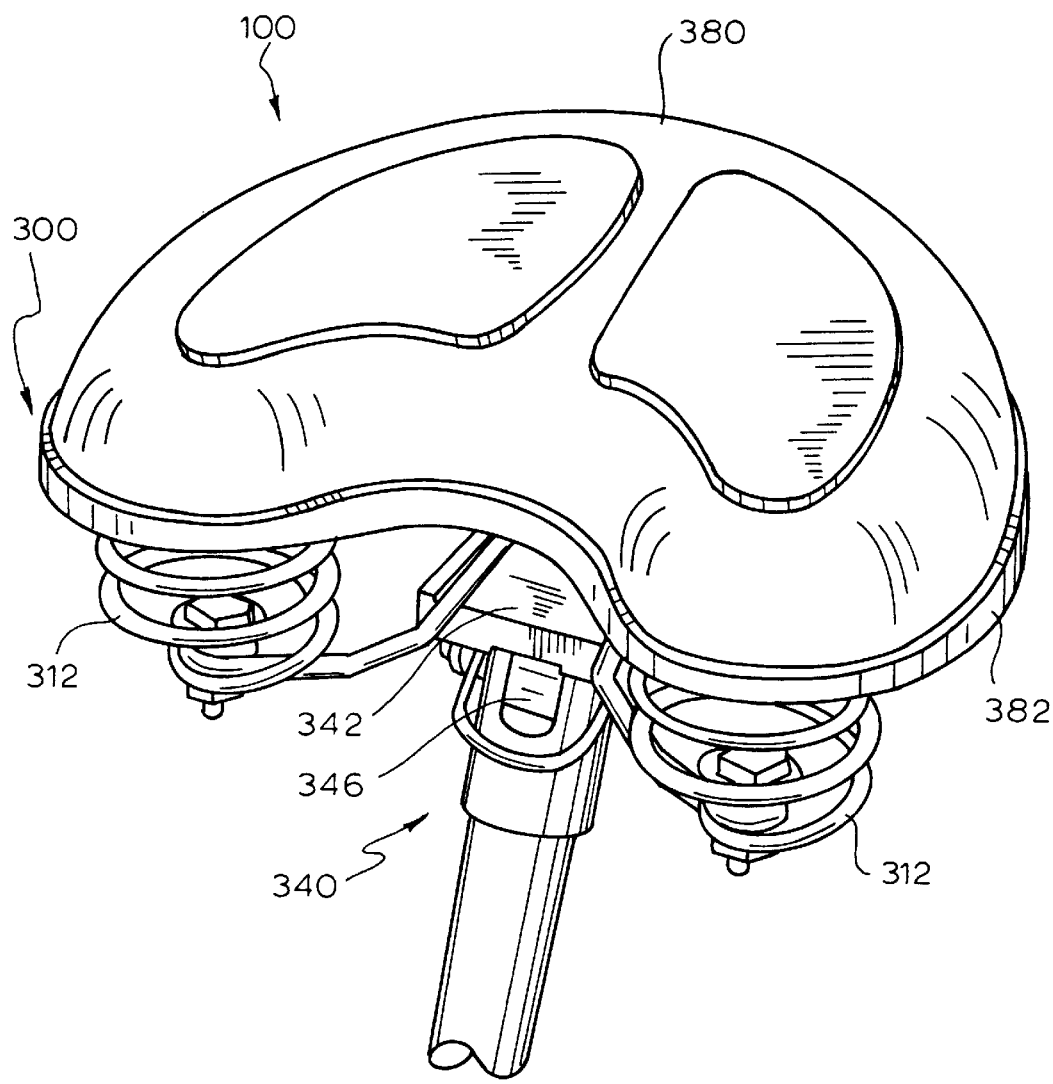
FIG. 8 depicts a top perspective view of the clip assembly 300 for a modified version of anatomically correct seat 100 of this invention.
Figure 9:
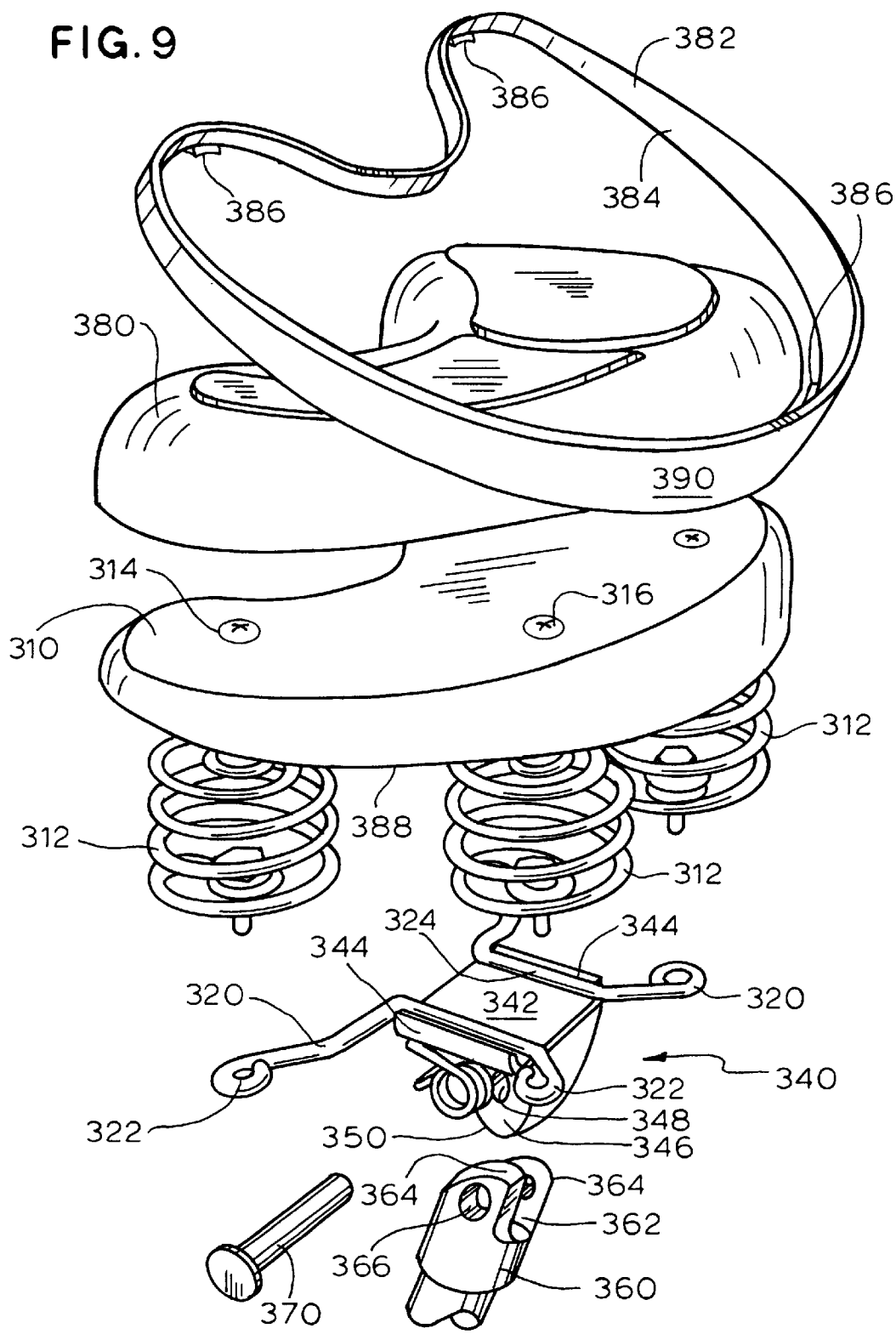
FIG. 9 depicts an exploded, top perspective view of the clip assembly 300 for a modified version anatomically correct seat 100 of this invention, which is reverse view of FIG. 8.

In FIG. 8 and FIG. 9, the clip assembly 300 for a modified version of the anatomically correct seat 100 of this invention is shown. An especially preferred clip assembly 300 for an anatomically correct bicycle 100 includes a seat platform 310. Mounted on the seat platform 310 is a shaped pad 350. A shaped clip member 382 secures the shaped pad 350 to the seat platform 310.

Below the seat platform 310, seat springs 312 are secured. In seat platform 310, are seat bolt apertures 314, which receive seat bolt bolts 316 in the form of first threaded member 172, second threaded member 174, third threaded member 176, and fourth threaded member 178. A seat spring 312 is then received on each threaded member.

Below the seat springs 312 is are seat braces 320. The two seat braces 320 receive two of the four seat bolts 316, and are positioned adjacent to each seat spring 312 and oppositely disposed from the seat platform 310. Each seat brace 320 is an elongated bent rod having a bolt receiving loop 322 at each end thereof. Centrally situated in each seat brace 320 is a bracket receiver 324. The bent rod is shaped to mount the seat platform 310 to bicycle efficiently.

The seat bracket 340 for mounting the seat 100 formed from clip assembly 300 to bicycle includes a platform 342. Preferably the platform 342 is rectangular in shape. On opposing sides of the platform 342 is a brace receiver 344. Each of the two brace receivers 344 is arced to wrap at least partially around bracket receiver 324. Each brace receiver 344 and bracket receiver 324 may be welded, glued, crimped or otherwise secured together.

Extending below the platform 342 of the seat bracket 340 is a flattened clamp receiver 346. The seat bracket 340 may be machined or molded, or otherwise shaped. Flattened clamp receiver 346 includes a clamp pin aperture 348 therein. Also flattened clamp receiver 346 has a arcuate bottom edge 350, Bottom edge 350 permit restricted movement of clip assembly 300 in a backward and froward motion.

The clamp 360 is secured to the bicycle post 152. This clamp 360 includes a slot 362 determined by two arms 364. Each arm 364 includes an arm aperture 366 adapted to receive a seat pin 370 and cooperate with clamp pin aperture 348, in order to secure the seat platform 310 to the bicycle post 152.

To seat platform 342 is secured a padded derriere support or shaped pad 380, preferably shaped to conform to the desired seat appearance set forth herein. While the padded derriere support 380 may be glued or other secured to the seat platform, it is preferred to use a clip 382 shaped to match the combination of the seat platform 342 and the shaped pad 380.

At a clip base 384 are preferably three wedges 386 adapted to contact the underside edge 388 of seat platform 342 at three different points. The arced side 390 of the clip 382 locks the padded derriere support 380 onto the seat platform 342. Preferably, the derriere support 380 is preferably a slightly flexible, molded one piece unit.

Figure 10:
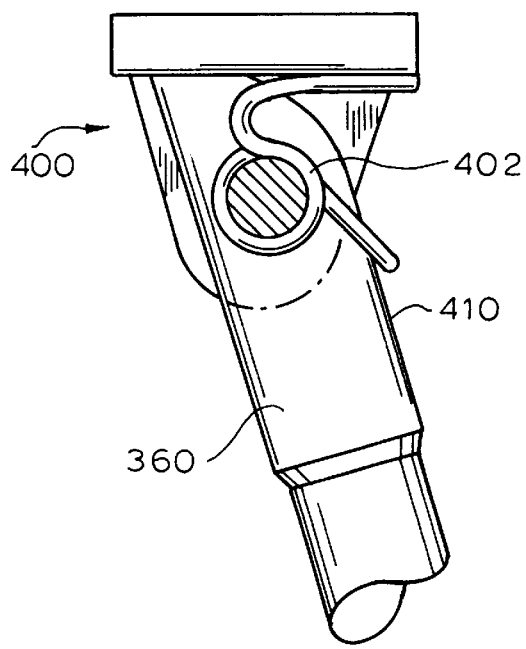
FIG. 10 depicts a side view of spring assembly 400 for clip assembly 300 as a modified version of anatomically correct seat 100 of this invention.
Figure 11:
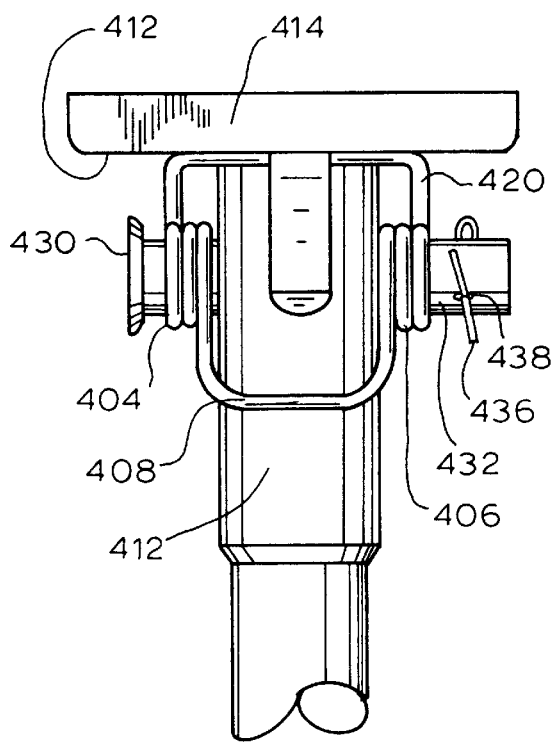
FIG. 11 depicts a front plan view of spring assembly 400 for clip assembly 300 as a modified version of anatomically correct seat 100 of this invention, based on FIG. 10.
Figure 12:
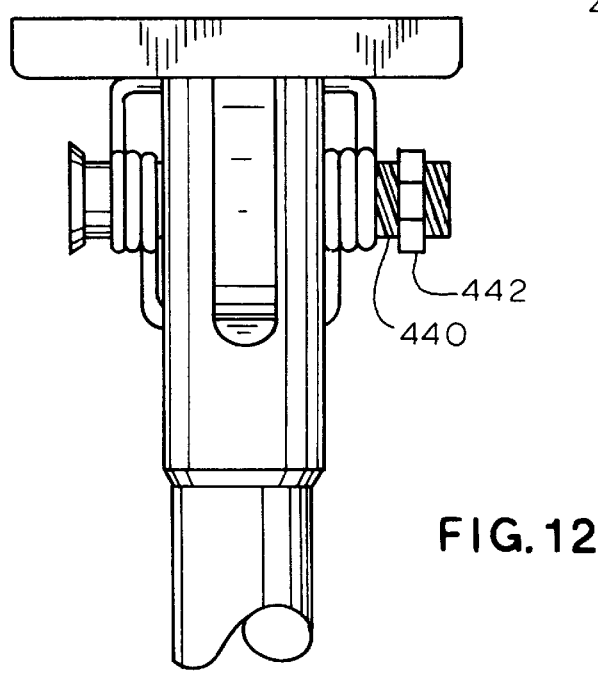
FIG. 12 depicts a rear plan view of spring assembly 400 for clip assembly 300 as a modified version of anatomically correct seat 100 of this invention, based on FIG. 10.

Finally adding FIG. 10, FIG. 11, and FIG. 12 to the consideration, spring assembly 400 for clip assembly 300 is particularly situated about clamp 360. Clamp 360 incudes slot 362 formed by arms 364. More spring assembly 400 includes a double coil spring 402. This double coil spring 402 cooperates with the seat pin 370, the clamp 360, flattened clamp receiver 346, clamp pin aperture 348, slot 362, arms 364, and arm apertures 366.

The double coil spring 402 has a first coil 404 and a second coil 406 connected by a U-shaped loop 408. U-shaped loop 408 fits around the front position 410 of the clamp 360, while first coil 404 is substantially adjacent to and substantially concentric with one of arm aperture 366. Second coil 406 is similarly positioned relative to the opposing arm aperture 366.

Each end 414 of the double coil spring 402 is braced against the underside 412 of seat bracket 340. The double coil spring 402 preferably terminates in a right angle bend 420 at each end thereof. The double coil spring 402 receives the seat pin 370 as the seat pin 370 passes then through clamp 360 and the clamp receiver 346.

Seat pin 370 has a head 430 and a barrel 432. The barrel 432 may slide through first coil 404 and into an arm aperture 366. The barrel 432 then passes through clamp pin aperture 348 and out through second arm aperture 366 and second coil 406. Head 430 stops the seat pin 370 at first coil 404.

Barrel 432, and thus pin seat pin 370, is supported in place by friction. Also, a cotter pin 436 with aperture cotter aperture 438 may be used. Additionally, threaded tip 440, may be use with barrel nut for securing purposes.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent is:

1. An anatomically correct bicycle seat having a seat platform to receive buttocks of a bicycle rider and a support mechanism for the seat platform in order to permit the anatomically correct seat adapted to be mounted on a bicycle; the anatomically correct bicycle seat further comprising:

(a) the seat platform including a base member and a padded member;

(b) the base member and the padded member combining to form a U-shaped member;

(c) the U-shaped member having incorporated therein an open design adapted to relieve pressure;

(d) the U-shaped member having a front edge and a rear outward arc;
(e) an inward arc being situated in a central portion of the front edge;
(f) the padded member having the seat platform on an upper portion of the padded member;
(g) the support mechanism including a seat bracket for mounting the seat to a bicycle;
(h) the seat bracket having a bracket platform;
(i) the bracket platform having a first brace receiver and a second brace receiver;
(j) the first brace receiver being oppositely disposed from the second brace receiver; and
(k) the base member including a brace assembly adapted to be received in the first brace receiver and the second brace receiver;
(l) the brace assembly including a first bracket receivable in the first brace receiver;
(m) the brace assembly including a second bracket receivable in the second brace receiver;
(n) the bracket platform being rectangular in shape;
(o) the first brace receiver and the second brace receiver being arced to wrap at least partially around the first bracket and the second bracket respectively; and
(p) the bracket platform having a clamp receiver therebelow.

2. The anatomically correct bicycle of claim 1 further comprising:
(a) the clamp receiver including a pin aperture therein; and
(b) the clamp receiver having an arcuate bottom edge, adapted to permit restricted movement in a backward and forward motion of the anatomically correct bicycle seat.

3. The anatomically correct bicycle seat of claim 2 further comprising:
(a) a seat clamp being adapted for being secured to a bicycle seat post for the bicycle;
(b) the seat clamp including a first arm and a second arm with a slot therebetween;
(c) the seat clamp including a first arm and a second arm with a slot therebetween;
(d) the slot being adapted to receive the clamp receiver; and
(e) the first arm having a first-arm aperture and the second arm having a second arm aperture therein.

4. The anatomically correct bicycle seat of claim 3 further comprising:
(a) the first and second arm apertures being adapted to receive a seat pin and cooperate with the pin aperture in order to secure the seat platform to the bicycle; and
(b) a double coil spring cooperating with the seat pin, the clamp and the clamp receiver.

5. The anatomically correct bicycle seat of claim 4 further comprising:
(a) the double coil spring having a first coil and a second coil;
(b) the first coil and the second coil being connected by a U-shaped loop;
(c) the U-shaped loop fitting around a front position of the clamp;
(d) the first coil being substantially adjacent to and substantially concentric with said first arm aperture; and
(e) the second coil being substantially adjacent to and substantially concentric with to said second arm aperture.

6. The anatomically correct bicycle seat of claim 5 further comprising:
(a) the double coil spring having a first spring end and a second spring end;
(b) the first spring end and the second spring end being braceable against an underside of the seat bracket; and
(c) the first coil and the second coil being substantially adapted to the seat pin as the seat pin passes through each of said arm apertures and a clamp aperture.

7. The anatomically correct bicycle seat of claim 6 further comprising:
(a) the seat platform and the padded member having a substantially similar edge outline;
(b) the shaped clip member being adapted to form the seat platform by securing the base member to the padded member;
(c) the shaped member having a clip base adapted to contact the base member on at least one point disposed oppositely from the padded member.

8. The anatomically correct bicycle seat of claim 7 further comprising:
(a) the clip base having at least two wedges adapted to contact the underside edge of the seat platform at different positions;
(b) the shaped clip member having an arced side; and
(c) the arced side holding the padded member onto the seat platform.

9. An anatomically correct bicycle seat having a platform to receive buttocks of a bicycle rider and a support mechanism for the platform in order to permit the anatomically correct seat to be mounted on a bicycle comprising:
(a) the platform including a U-shaped member;
(b) the U-shaped member having incorporated therein an open design adapted to relieve pressure;
(c) the U-shaped member having a front edge and a rear outward arc;
(d) an inward arc being situated in the front edges;
(e) the platform including a top surface and a bottom surface;
(f) the support mechanism being mounted on the bottom surface; and
(g) the top surface being adapted to receive the buttocks;
(h) the top surface including protrusions adapted to receive the buttocks;
(i) the protrusions including a first protrusion and a second protrusion;
(j) the buttocks including a first buttock and a second buttock;
(k) the first protrusion receiving the first buttock; and
(l) the second protrusion receiving the second buttock.

10. The anatomically correct bicycle seat of claim 9 further comprising:
(a) the protrusions being adapted to assist positioning of the buttocks of a bicycle rider, while minimizing undesired pressure on nerves or blood vessels;
(b) the support mechanism including a rod assembly and a spring assembly; and
(c) the rod assembly cooperating with the spring assembly.

11. The anatomically correct bicycle seat of claim 10 further comprising:

(a) the support mechanism including a bolt assembly;

(b) the bolt assembly being adapted to support the rod assembly and the spring assembly;

(c) a nut assembly being adapted to cooperate with the bolt assembly and support the rod assembly and the spring assembly; and (d) the rod assembly being adapted to mount the anatomically correct bicycle seat on the bicycle.

12. An anatomically correct bicycle seat having a seat platform to receive buttocks of a bicycle rider and a support mechanism for the seat platform in order to permit the anatomically correct seat to be mounted on a bicycle; the anatomically correct bicycle seat further comprising:

(a) the seat platform including a base member and a padded member;

(b) the base member and the padded member combining to form a U-shaped member;

(c) the U-shaped member having incorporated therein an open design adapted to relieve pressure;

(d) the U-shaped member having a front edge and a rear outward arc;

(e) an inward arc being situated in a central portion of the front edge;

(f) the padded member having the seat platform on an upper portion of the padded member;

(g) the upper portion having a first raised member and a second raised member;

(h) the first raised member being oppositely disposed from the second raised member; and (h) the first raised member and the second raised member being situated on opposite sides of the inward arc.

13. The anatomically correct bicycle of claim 12 further comprising the base member and the padded member being a single unit.

14. The anatomically correct bicycle of claim 12 further comprising:

(a) the base member and the padded member being a single unit;

(b) a shaped clip member securing the base member to the padded member; and (c) the shaped clip member providing for replacement of the padded member.

15. In a bicycle having a seat adapted to receive buttocks of a bicycle rider, the improvement comprising an anatomically correct bicycle seat being mounted on the bicycle, the anatomically correct bicycle seat further comprising:

a platform to receive buttocks of a bicycle rider cooperating with a support mechanism in order to permit the anatomically correct seat to be mounted on the bicycle;

the platform including a U-shaped member;

the U-shaped member having incorporated therein an open design adapted to relieve pressure;

the U-shaped member having a front edge and a rear outward arc;

an inward arc being situated in the front edge;

the platform including a top surface and a bottom surface;

the support mechanism being mounted on the bottom surface; and the top surface being adapted to receive the buttocks; the protrusions being adapted to assist positioning of the buttocks of a bicycle rider, while minimizing undesired pressure on nerves or blood vessels.

* * * * *